May 9, 1950   F. I. HOLMGREN ET AL   2,507,159
KETTLE DRAINING DEVICE
Filed April 14, 1947   2 Sheets-Sheet 1
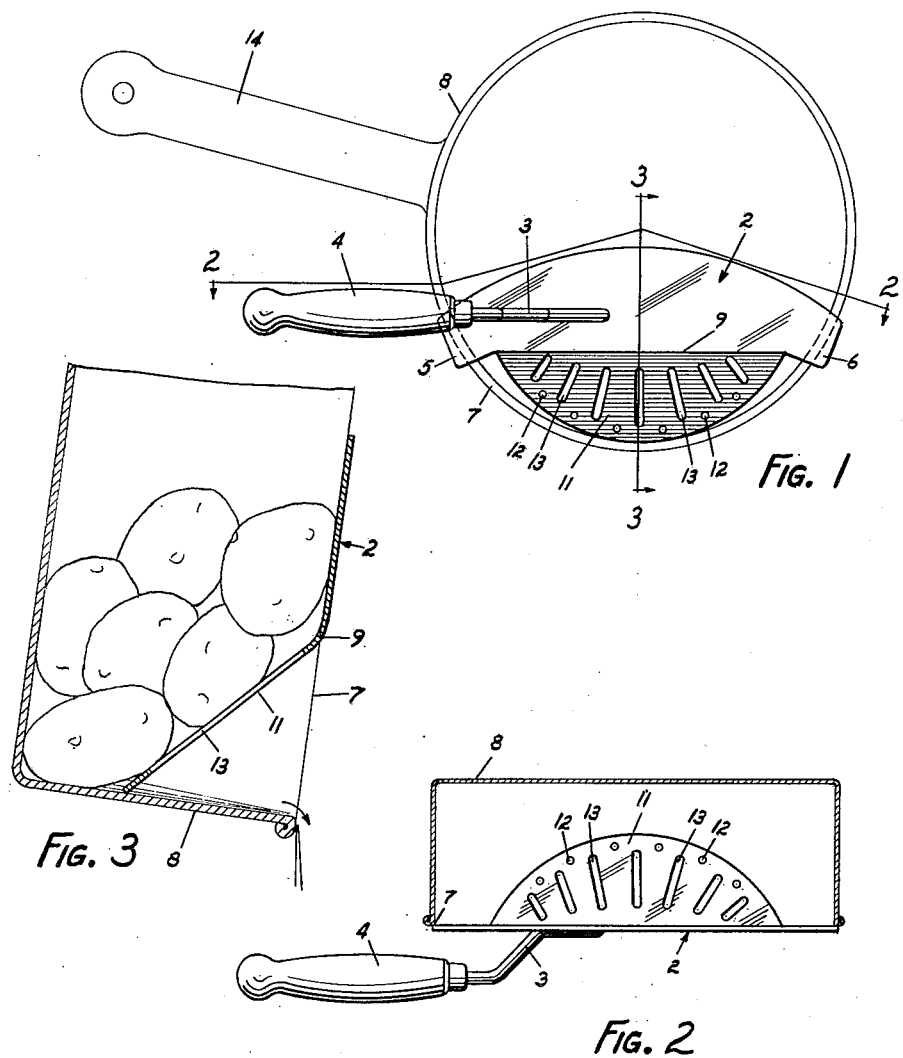
INVENTORS
FREDA I. HOLMGREN
FRANK A. HOLMGREN
BY
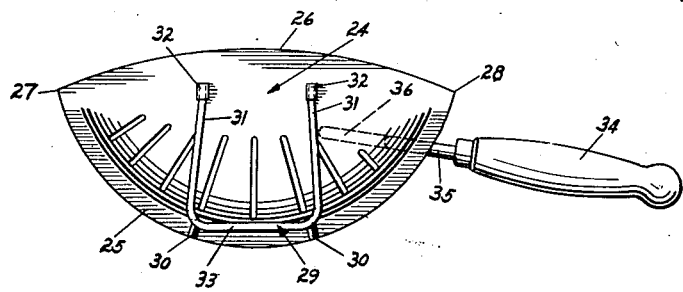
ATTORNEYS May 9, 1950     F. I. HOLMGREN ET AL     2,507,159
KETTLE DRAINING DEVICE
Filed April 14, 1947     2 Sheets-Sheet 2
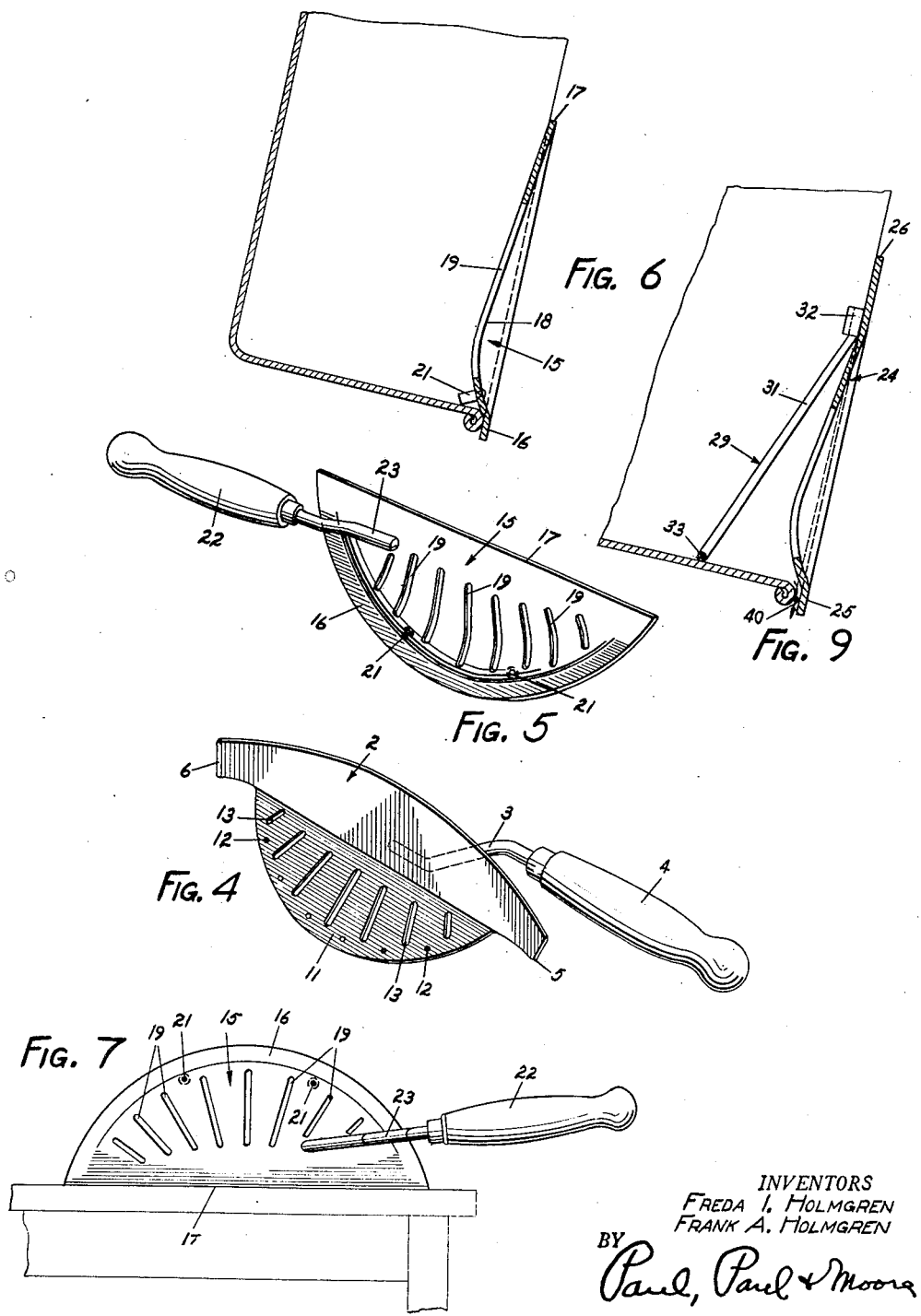
INVENTORS
FREDA I. HOLMGREN
FRANK A. HOLMGREN Patented May 9, 1950

2,507,159

UNITED STATES PATENT OFFICE 2,507,159

KETTLE DRAINING DEVICE

Freda I. Holmgren and Frank A. Holmgren,
Minneapolis, Minn.

Application April 14, 1947, Serial No. 741,272

2 Claims. (Cl. 210—163.5)

This invention relates to new and useful improvements in kettle draining devices, and more particularly to such a device which may be conveniently utilized by a housewife or other individual in the operation of draining water or liquid from a kettle or sauce pan without the solid contents of the kettle discharging therefrom.

Numerous attempts have heretofore been made in an effort to provide a simple and practical kettle drainer of this general type, but to the best of our knowledge, none have succeeded in producing a drainer of this type which has been entirely satisfactory.

The novel kettle drainer herein disclosed is the result of considerable experimental and research work in an attempt to develop and produce a kettle drainer of this type which is so designed and constructed that it may readily be applied to kettles of various sizes, and which embodies all of the desirable features desired in a device of this general type, and wherein all of the objectionable features now inherent in most structures of this type now in common use, have been eliminated.

A further object is to provide a simple and inexpensive kettle drainer comprising a plate-like body portion having its opposed ends adapted to be seated upon the edge of an open kettle top, and having an inwardly turned portion disposed at an angle to said body portion and adapted to engage a side wall of the kettle when the drainer is operatively supported thereon, whereby said inclined body portion will cooperate with the kettle rim engaging portions of said body to retain the drainer in the correct position upon the kettle, when the latter is tilted to pour the liquid contents therefrom and whereby the operation of draining a liquid from a kettle becomes a very simple one.

A further object is to provide a device of this general type comprising a body portion which preferably is imperforate or void of apertures, and is provided on one side with a diverging plate-like portion which extends into the kettle and is perforated to permit the liquid contents in the kettle to readily pour through the apertures therein when the kettle is tilted to a pouring position.

A further object is to provide a device of the character described comprising a slightly concave body portion having suitable perforations along at least one side thereof, and said body portion having an arcuately formed marginal edge portion adapted to be seated upon the edge of a kettle and having means projecting laterally therefrom adapted to engage a side wall of the kettle thereby to retain the device in proper position upon the open top kettle when the device is applied thereto preparatory to draining a liquid from the kettle.

Other objects of the invention reside in the attractive manner in which the device is configurated and also in the simple means provided thereon for engaging a wall of the kettle to retain the device in proper position thereon; in the provision of such a device which may readily be stamped and formed from sheet metal; in the provision of such a device which, in addition to serving as a kettle drainer, may also be utilized for scraping crumbs from a table top; and in the provision of such a device which is extremely simple and inexpensive to manufacture whereby it readily lends itself for manufacture in quantity production whereby it may be sold at a profit at a moderate price.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a view showing the invention applied to a kettle with the kettle tilted to a liquid-pouring position.

Figure 2 is a sectional plan view substantially on the line 2—2 of Figure 1, showing the metallic plate-like body of the device seated on the edge of the kettle with the inclined straining portion extending into the kettle.

Figure 3 is an enlarged detail sectional view on the line 3—3 of Figure 1 illustrating the drainer in position within the kettle;

Figure 4 is a perspective view of the drainer removed from the kettle and showing the opposite side thereof from the one shown in Figure 1;

Figure 5 is a view showing a kettle drainer of slightly different construction, having a straight edge whereby it may also be used as a crumb scraper;

Figure 6 is a detail sectional view on an enlarged scale showing the drainer illustrated in Figure 5 positioned upon a kettle when pouring a liquid therefrom;

Figure 7 is a view showing the device of Figure 5 utilized as a crumb scraper;

Figure 8 is a view showing a drainer somewhat similar to the one shown in Figure 5, but having an upper arcuately formed edge and a suitable U-shaped wire element being secured thereto and extending outwardly therefrom at a slight angle whereby it may engage the wall of a kettle to retain the device in position thereon as will be understood by reference to Figure 9; and Figure 9 is an enlarged detail sectional view similar to Figure 6 showing the drainer illustrated in Figure 8 operatively positioned in a kettle.

The novel kettle drainer herein disclosed, and as illustrated in Figures 1, 2, 3 and 4, comprises an elongated plate-like body portion 2 having the shank 3 of a suitable handle 4 secured thereto by suitable means such as electric spot welding. The handle is preferably disposed in longitudinal alignment with the body 2, as best illustrated in Figure 1, but may be otherwise arranged if desired.

The opposed end portions 5 and 6 of the body portion 2 are preferably disposed in a common plane with the body 2, and are adapted to seat upon the upper edge 7 of the top of the kettle 8, as clearly illustrated in Figure 1.

Secured to the body portion 2 along its lower edge 9, when viewed as shown in Figure 1, is an inwardly inclined plate portion 11 which, for the sake of simplicity, is preferably integrally formed with the body portion 2.

The inwardly extending portion 11 is provided with suitable perforations 12 and 13, the perforations 12 being preferably in the form of small holes which are disposed close to the marginal edge of the plate portion 11, and the apertures 13 being shown elongated and extending upwardly from adjacent the perforations 12 to a point along the juncture of the plate portion 11 with the body portion 2.

The inwardly extending inclined plate portion 11 is so fashioned with respect to the body portion 2 that when the device is operatively placed on top of a kettle, as shown in Figure 1, and the kettle is tilted to a pouring position, the device may readily and conveniently be held in proper position upon the kettle by simply grasping the handle 4 and firmly holding the end portions 5 and 6 of the body 2 in contact with the upper edge 7 of the kettle, while grasping the kettle by its handle 14 with the other hand. When the device is seated upon the kettle as above described, all the liquid contained in the kettle may readily be poured therfrom without any danger of the solid contents in the kettle discharging therefrom, as will be understood by reference to Figure 3.

The device disclosed in Figures 1 to 4, inclusive, presents the utmost in sanitation in that it comprises no sharp bends or cracks or crevices where foreign matter may accumulate. It is preferably made from stainless steel which has considerable strength and may readily be formed by suitable forming dies.

In Figures 5, 6 and 7, we have shown a kettle drainer of slightly different construction, which comprises a body 15 having a marginal edge portion 16 which is arcuately formed to correspond substantially to the curvature of the edge of the kettle shown upon which the device is to be used. The opposite edge 17 of the body 15 is preferably made straight from one end to the other, and said edge portion is disposed in a common plane with the curved marginal edge portion 16, as will be understood by reference to Figure 6.

The central portion of the body 15 is preferably inwardly bent or dished as shown at 18 in Figure 6, and suitably elongated perforations 19 are provided in the dished portion of the body, as clearly illustrated in Figures 5 and 6. The perforations 19 may be otherwise shaped or formed if desired.

To assist in holding the kettle drainer shown in Figures 5, 6 and 7 in proper position, on the top of a kettle, a pair of laterally disposed projections 21 are provided on the body 15 adjacent to the curved marginal edge portion 16 substantially as shown in Figure 5. These inwardly extending projections 21 may be in the form of metallic studs each having one end riveted to the body 15 or otherwise secured thereto whereby they become in effect a permanent part of the body 15.

The studs 21 are so fashioned that when the kettle drainer is placed upon the top of a kettle, the studs 21 will engage a wall of the kettle and thereby retain the drainer in proper position upon the kettle so long as the operator firmly holds the drainer in contact with the upper edge of the kettle. The straight edge 17 of the kettle drainer shown in Figure 5, may be utilized for scraping crumbs from the top of the table or other flat surfaces, as indicated in Figure 7, which further adds to the usefulness of the device. A suitable handle 22 having a shank 23 is secured to the body 15 of the drainer shown in Figures 5, 6 and 7 for the convenience of the operator in manipulating the device.

In Figures 8 and 9, there is shown a kettle drainer comprising a body portion 24 having an arcuately formed marginal edge portion 25 corresponding to the edge portion 16 of the structure illustrated in Figure 5. The opposed edge 26 of the body 24 is preferably arcuately formed, as shown in Figure 8.

To assist the operator in holding the kettle drainer shown in Figures 8 and 9 in operative position upon the kettle, as shown in Figure 9, a suitable U-shaped element 29 is shown having the terminals of its spaced legs 31 suitably secured to the body 24 by suitable means such as by outwardly striking portions of the metal from the body 24 to form sockets 32 for receiving the terminals of the legs 31, as indicated in Figure 8.

The legs 31 are slightly outwardly bent adjacent to the sockets 32 whereby the horizontal bar 33 of the U-shaped member 29 may engage the wall of the kettle body at a point spaced inwardly from the top edge of the kettle, as best shown in Figure 9. The marginal edge portion 25 of the drainer shown in Figure 8, is preferably formed with spaced ribs or projections 30, to slightly outwardly space the lower portion of the flange 25 from the adjacent edge of the kettle top, thereby to provide a small gap between the flange and kettle edge, as shown at 40 in Figure 9, to facilitate quickly draining the water from the kettle.

The drainer shown in Figures 8 and 9 is provided with a suitable handle 34 having a shank 35 whose inner end portion 36 is suitably secured to its body 24 by such means as electric spot welding.

The novel apparatus herein disclosed is extremely simple and inexpensive and readily lends itself for manufacture in quantity production. It may be made from any material suitable for the purpose. Stainless steel has been found very desirable, as it has considerable strength and the device may be made of comparatively thin stock whereby it is extremely light in weight, which is a very desirable attribute in a device of this general type.

It will be apparent to those skilled in the art that we have accomplished at least the principal objects of our invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that our invention is not limited thereto.

What we claim is:

1. A kettle drainer comprising a perforated plate-like body for covering one side of the open end of a kettle, said plate-like body having an arcuate edge adapted to extend over the edge of the open end of a kettle and an opposed edge adapted to extend across the open end of said kettle, said plate-like body having a marginal edge portion adjacent said arcuate edge provided with a plurality of projections adapted to rest on the edge of the open end of a kettle and maintain said marginal edge portion in spaced relation with respect to said edge of the open end of a kettle to provide an opening therebetween, and a handle including a shank member secured to one face of said plate-like body, the face of said plate-like body to which said shank is secured being provided with a concave portion adjacent said marginal edge portion and adapted to overhang the opening between the edge of the open end of a kettle and said spaced marginal edge portion, whereby liquid is permitted to drain from said kettle through the opening provided at said spaced marginal edge while said concave portion restrains the solid contents of said kettle from entering said opening.

2. A kettle drainer comprising a perforated plate-like body for covering one side of the open end of a kettle, said plate-like body having an arcuate edge adapted to extend over the edge of the open end of a kettle and an opposed edge adapted to extend across the open end of said kettle, said plate-like body having a marginal edge portion adjacent said arcuate edge provided with a plurality of projections adapted to rest on the edge of the open end of a kettle and maintain said marginal edge portion in spaced relation with respect to said edge of the open end of a kettle, a handle including a shank member secured to one face of said plate-like body adjacent the edge thereof opposed to said arcuate edge, the face of said plate-like body to which said shank is secured being provided with a concave portion adjacent said marginal edge portion and adapted to overhang the opening between the edge of the open end of a kettle and said spaced marginal edge portion, and a U-shaped member including a horizontal bar portion and a pair of spaced legs, the ends of said spaced legs being secured to the face of said plate-like body opposite that to which said handle shank member is secured substantially equidistant from the center of said plate-like body and adjacent the edge thereof opposed to said arcuate edge, said spaced legs being bent outwardly from said plate-like body to permit said horizontal bar portion to engage the inside wall of said kettle whereby said U-shaped member engages the inside wall of a kettle to center said drainer in one side of the open end of the kettle and stabilize the upper portion of said drainer while liquid is permitted to drain from said kettle through the opening provided between the edge of said kettle and the marginal edge portion spaced therefrom as said concave portion restrains the solid contents of said kettle from entering said opening.

FREDA I. HOLMGREN.
FRANK A. HOLMGREN.

REFERENCES CITED

The following references are of record in the file of this patent:

UNITED STATES PATENTS

| Number | Name | Date |
| --- | --- | --- |
| Re. 21,688 | Van Ness | Jan. 7, 1941 |
| 384,977 | Hopkins | June 26, 1888 |
| 419,520 | Hauck, Jr. | Jan. 14, 1890 |
| 434,452 | Mathews | Aug. 19, 1890 |
| 922,341 | Schmidt | May 18, 1909 |
| 992,268 | Schmidt | May 16, 1911 |
| 1,058,146 | Burdia | Apr. 8, 1913 |
| 2,133,724 | Smulski | Oct. 18, 1938 |
| 2,198,059 | Pistorius | Apr. 23, 1940 |
| 2,390,753 | Trindl | Dec. 11, 1945 |